United States Patent
Nakajima et al.

(10) Patent No.: US 10,346,112 B2
(45) Date of Patent: Jul. 9, 2019

(54) REMOTE COMMUNICATION CONTROL SYSTEM THAT IMPROVES SECURITY OF REMOTE SESSION BETWEEN IMAGE FORMING APPARATUS AND CONNECTION TERMINAL, SESSION RELAY SYSTEM, AND RECORDING MEDIUM

(71) Applicant: KYOCERA Document Solutions Inc., Osaka (JP)

(72) Inventors: Koki Nakajima, Osaka (JP); Takeshi Nakamura, Osaka (JP); Keisuke Fukushima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/994,724

(22) Filed: May 31, 2018

(65) Prior Publication Data

US 2019/0004758 A1 Jan. 3, 2019

(30) Foreign Application Priority Data

Jun. 30, 2017 (JP) .................. 2017-128663

(51) Int. Cl.
| | |
|---|---|
| *G06F 15/00* | (2006.01) |
| *G06K 1/00* | (2006.01) |
| *G06K 15/00* | (2006.01) |
| *G06F 3/12* | (2006.01) |
| *H04L 29/08* | (2006.01) |
| *H04N 1/44* | (2006.01) |

(52) U.S. Cl.
CPC .......... *G06F 3/1259* (2013.01); *G06F 3/1207* (2013.01); *G06F 3/1222* (2013.01); *G06F 3/1239* (2013.01); *G06F 3/1288* (2013.01); *H04L 67/141* (2013.01); *H04N 1/4406* (2013.01); *G06F 3/1203* (2013.01); *G06F 3/1236* (2013.01); *G06F 3/1238* (2013.01)

(58) Field of Classification Search
CPC .... G06F 3/1259; G06F 3/1207; G06F 3/1222; G06F 3/1236; G06F 3/1238; G06F 3/1203; G06F 3/1288; G06F 3/1239; H04L 67/141; H04N 1/4406
USPC ....................... 358/1.1, 1.14, 1.15
See application file for complete search history.

(56) References Cited

U.S. PATENT DOCUMENTS

| | | | | |
|---|---|---|---|---|
| 2003/0078965 | A1* | 4/2003 | Cocotis | ........... H04L 29/06 709/203 |
| 2006/0195495 | A1 | 8/2006 | Asano | ................ 708/111 |
| 2014/0310039 | A1* | 10/2014 | Casey | ........ G06Q 30/0635 705/7.13 |

FOREIGN PATENT DOCUMENTS

JP 2006-238199 A 9/2006

* cited by examiner

*Primary Examiner* — Douglas Q Tran
(74) *Attorney, Agent, or Firm* — Stein IP, LLC

(57) ABSTRACT

A remote communication control system includes a session relay system that associates a connection established with an image forming apparatus with a connection established with an electronic device located outside a network to which the image forming apparatus belongs, so as to relay a session between the image forming apparatus and the electronic device. When an application is unusable via the session, the session relay system does not relay the session based on a control policy and identification information of the application as a target for the session. The control policy indicates whether which application of the image forming apparatus is usable via the session.

3 Claims, 16 Drawing Sheets

REMOTE COMMUNICATION CONTROL SYSTEM THAT IMPROVES SECURITY OF REMOTE SESSION BETWEEN IMAGE FORMING APPARATUS AND CONNECTION TERMINAL, SESSION RELAY SYSTEM, AND RECORDING MEDIUM

INCORPORATION BY REFERENCE

This application is based upon, and claims the benefit of priority from, corresponding Japanese Patent Application No. 2017-128663 filed in the Japan Patent Office on Jun. 30, 2017, the entire contents of which are incorporated herein by reference.

BACKGROUND

Unless otherwise indicated herein, the description in this section is not prior art to the claims in this application and is not admitted to be prior art by inclusion in this section.

There is known a system that executes a communication between an image forming apparatus and an electronic device located inside a Local Area Network (LAN) to which the image forming apparatus belongs. This system causes the image forming apparatus to display a User Interface (UI) screen generated by the electronic device and causes the image forming apparatus to execute a print job based on print data accumulated in the electronic device.

SUMMARY

A remote communication control system according to one aspect of the disclosure includes a session relay system that associates a connection established with an image forming apparatus with a connection established with an electronic device located outside a network to which the image forming apparatus belongs, so as to relay a session between the image forming apparatus and the electronic device. When an application is unusable via the session, the session relay system does not relay the session based on a control policy and identification information of the application as a target for the session. The control policy indicates whether which application of the image forming apparatus is usable via the session.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
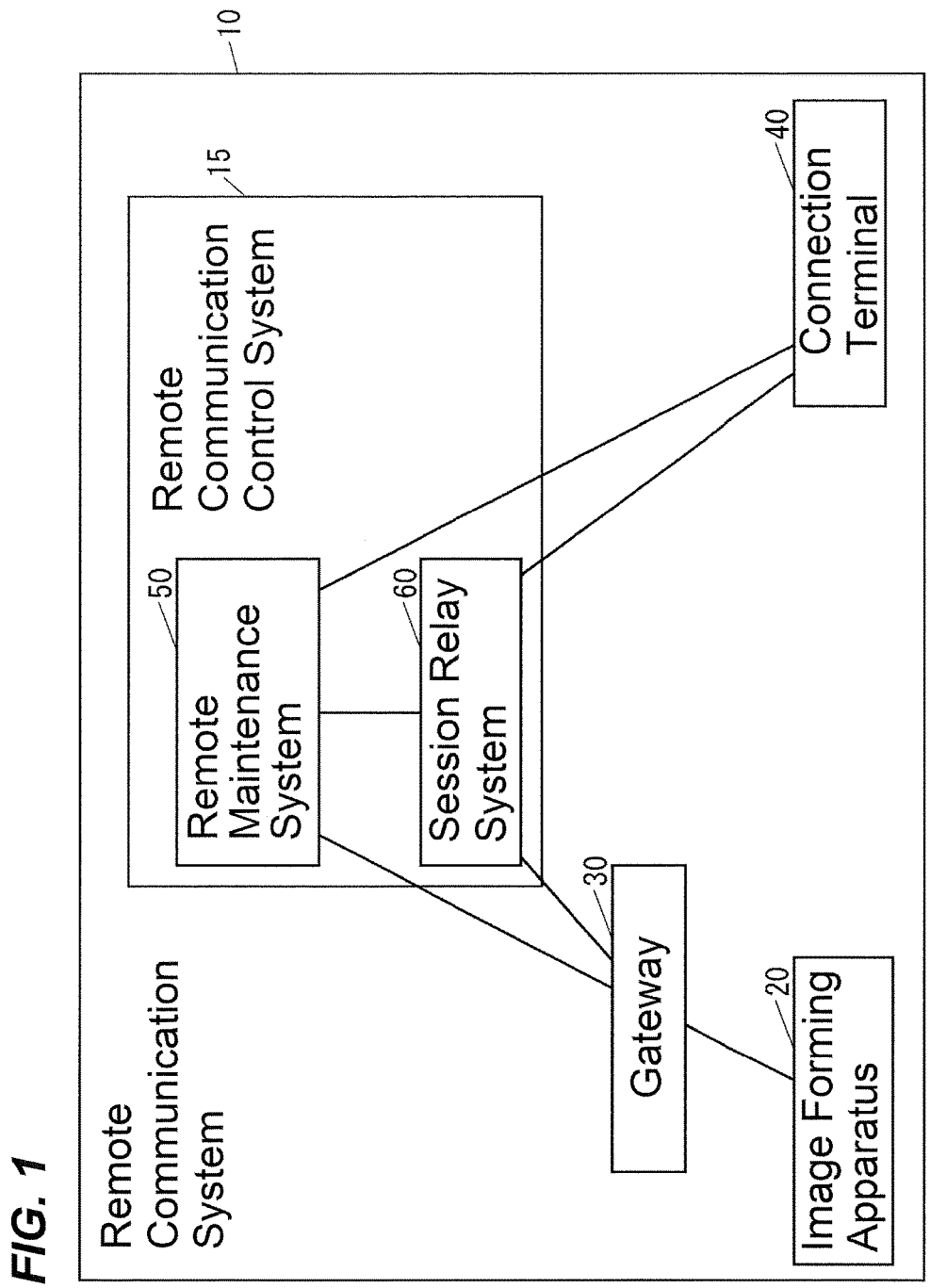
FIG. 1 illustrates a block diagram of a remote communication system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a configuration of a remote communication system according to the embodiment will be described.

FIG. 1 illustrates a block diagram of a remote communication system 10 according to the embodiment.

As illustrated in FIG. 1, the remote communication system 10 includes an image forming apparatus 20, a gateway 30, a connection terminal 40, and a remote communication control system 15. The gateway 30 connects a network, such as a Local Area Network (LAN), to which the image forming apparatus 20 belongs, to a network, such as the Internet. The connection terminal 40 is an electronic device located outside the network to which the image forming apparatus 20 belongs. The remote communication control system 15 controls a communication between the image forming apparatus included in the remote communication system 10 and the connection terminal included in the remote communication system 10.

The remote communication control system 15 includes a remote maintenance system 50 and a session relay system 60. The remote maintenance system 50 is a cloud service that executes a remote maintenance to the image forming apparatus included in the remote communication system 10 corresponding to an instruction from the connection terminal included in the remote communication system 10. The session relay system 60 is a cloud service that relays a direct interconnection between the image forming apparatus included in the remote communication system 10 and the connection terminal included in the remote communication system 10, that is, a Peer to Peer session (hereinafter referred to as a "remote session").

The remote communication system 10 can include an image forming apparatus in addition to the image forming apparatus 20 in the network to which the image forming apparatus 20 belongs. The remote communication system 10 can include a network to which an image forming apparatus belongs in addition to the network to which the image forming apparatus 20 belongs. The image forming apparatus included in the remote communication system 10 is, for example, an image forming apparatus, such as a Multifunction Peripheral (MFP), a printer-only machine, a copy-only machine, a FAX-only machine, and a scanner-only machine.

The gateway 30 configures a firewall that prevents an attack to an inside of the network to which the image forming apparatus 20 belongs from an outside of this network. Therefore, a communication between the image forming apparatus included in the remote communication system 10 and the remote maintenance system 50 is maintained by keeping the image forming apparatus included in the remote communication system 10 connecting to the remote maintenance system 50 by an Extensible Messaging and Presence Protocol (XMPP).

The remote communication system 10 can include a connection terminal in addition to the connection terminal 40. The connection terminal included in the remote communication system 10 is, for example, a computer, such as a Personal Computer (PC).

The remote maintenance system 50 is constituted of, for example, a server computer. The remote maintenance executed by the remote maintenance system 50 is, for example, maintenance, such as a confirmation of a counter of the image forming apparatus and an installation of firmware to the image forming apparatus. The remote maintenance system 50 not only executes the remote maintenance but also manages a remote session.

The session relay system 60 is constituted of, for example, a server computer.

The image forming apparatus included in the remote communication system 10 and the remote maintenance system 50 can communicate via a network, such as the Internet. The image forming apparatus included in the remote communication system 10 and the session relay system 60 can communicate via a network, such as the Internet. The connection terminal included in the remote communication system 10 and the remote maintenance system 50 can communicate via a network, such as the Internet. The connection terminal included in the remote communication system 10 and the session relay system 60 can communicate via a network, such as the Internet. The remote maintenance system 50 and the session relay system 60 can communicate via a network, such as the Internet.

Figure 2:
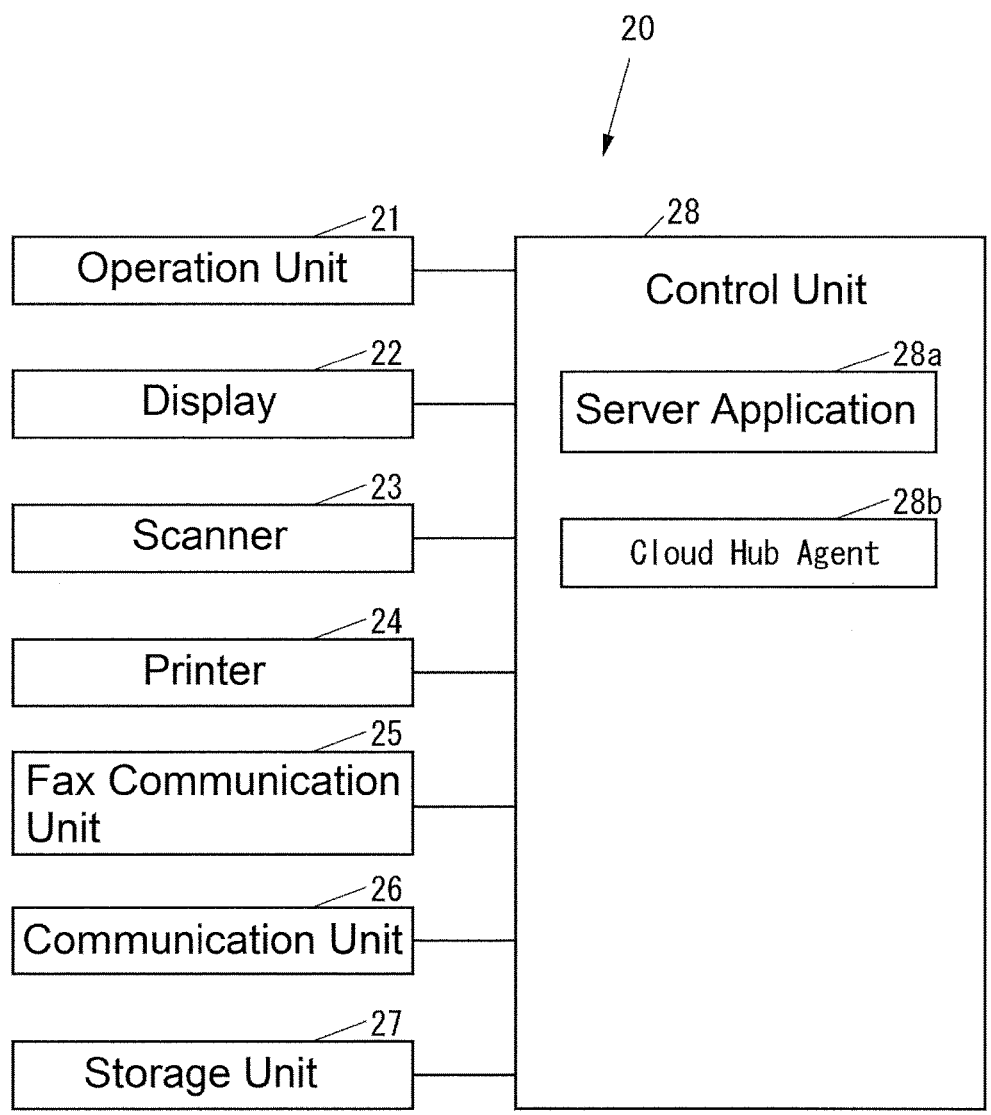
FIG. 2 illustrates a block diagram when an image forming apparatus according to the one embodiment is an MFP.

FIG. 2 illustrates a block diagram when the image forming apparatus 20 is an MFP.

The image forming apparatus 20 illustrated in FIG. 2 includes an operation unit 21, a display 22, a scanner 23, a printer 24, a fax communication unit 25, a communication unit 26, a storage unit 27, and a control unit 28. The operation unit 21 is an input device, such as buttons, with which various kinds of operations are input. The display 22 is a display device, such as a Liquid Crystal Display (LCD), that displays various pieces of information. The scanner 23 is a reading device that reads an image from an original document. The printer 24 is a print device that prints the image on a recording medium, such as a paper sheet. The fax communication unit 25 is a facsimile device that carries out fax communication with an external fax device (not illustrated) via a communication line, such as a dial-up line. The communication unit 26 is a communication device that communicates with an external device via a network or directly with wire or wireless without via a network. The storage unit 27 is a non-volatile storage device, such as a semiconductor memory and a Hard Disk Drive (HDD), that stores various pieces of information. The control unit 28 controls the whole image forming apparatus 20.

The control unit 28 includes, for example, a Central Processing Unit (CPU), a Read Only Memory (ROM) that stores programs and various data, and a Random Access Memory (RAM) used as a work area for the CPU. The CPU executes the programs stored in the ROM or the storage unit 27.

The control unit 28 executes the programs stored in the ROM or the storage unit 27 to implement a server application 28a used from the connection terminal included in the remote communication system 10 via the remote session and a Cloud Hub Agent 28b that controls a communication with the session relay system 60 (see FIG. 1).

The control unit 28 can implement a server application in addition to the server application 28a by executing the programs stored in the ROM or the storage unit 27.

The server application implemented by the control unit 28 includes, for example, a Web Server that notifies the outside of the network to which the image forming apparatus 20 belongs of various setting conditions of the image forming apparatus 20 and accepts various settings of the image forming apparatus 20 from the outside of the network to which the image forming apparatus 20 belongs. Additionally, the server application implemented by the control unit 28 includes, for example, a Remote APP Server that transmits data of a screen (for example, a Webpage) displayed on the display 22 of the image forming apparatus 20 to the outside of the network to which the image forming apparatus 20 belongs and receives an operation to the screen displayed based on this data from the outside of the network to which the image forming apparatus 20 belongs to cause the image forming apparatus 20 to operate corresponding to the received operation.

The server application implemented by the control unit 28 can be identified by an application ID.

Figure 3:
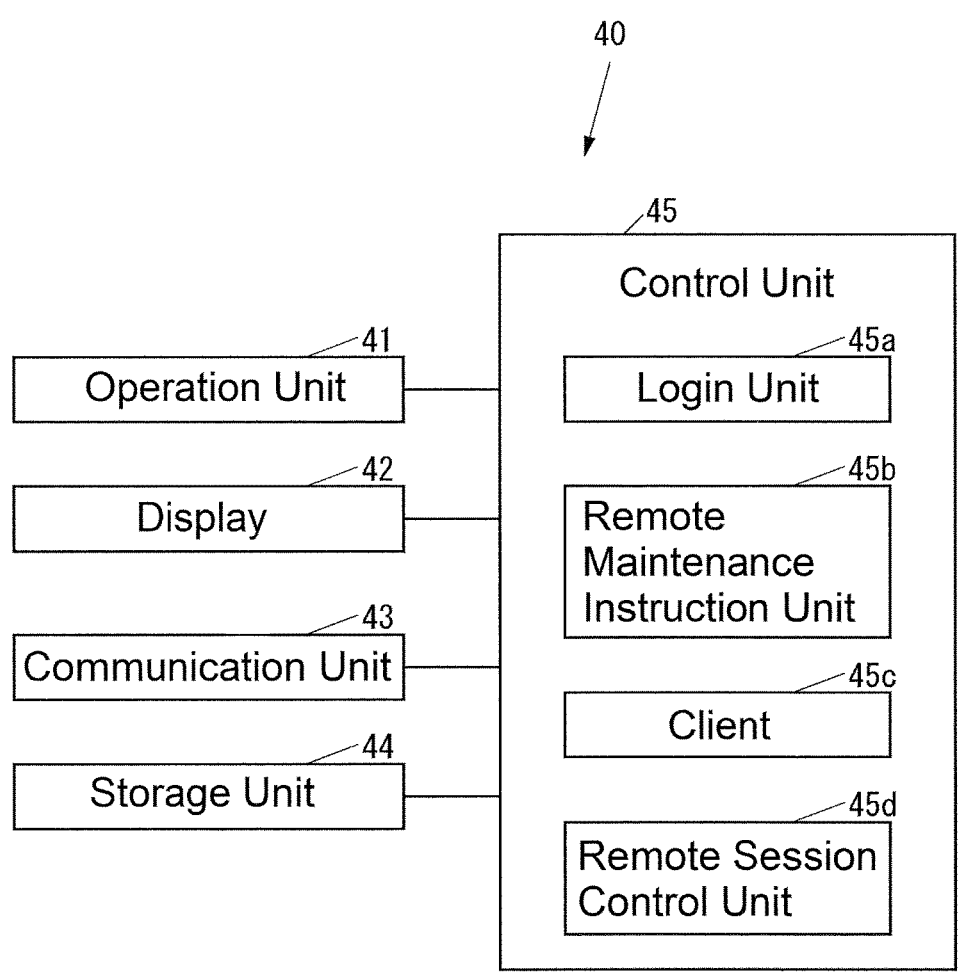
FIG. 3 illustrates a block diagram of a connection terminal according to the one embodiment.

FIG. 3 illustrates a block diagram of the connection terminal 40.

As illustrated in FIG. 3, the connection terminal 40 includes an operation unit 41, a display 42, a communication unit 43, a storage unit 44, and a control unit 45. The operation unit 41 is an input device, such as a keyboard and a mouse, with which various kinds of operations are input. The display 42 is a display device, such as an LCD, that displays various pieces of information. The communication unit 43 is a communication device that communicates with an external device via the network or directly with wire or wireless without via the network. The storage unit 44 is a non-volatile storage device, such as a semiconductor memory and an HDD, that stores various pieces of information. The control unit 45 controls the whole connection terminal 40.

The control unit 45 includes, for example, a CPU, a ROM that stores programs and various data, and a RAM used as a work area for the CPU. The CPU executes the programs stored in the ROM or the storage unit 44.

The control unit 45 executes the programs stored in the ROM or the storage unit 44 to implement a login unit 45a, a remote maintenance instruction unit 45b, a client 45c, and a remote session control unit 45d. The login unit 45a executes a login process to the remote maintenance system 50. The remote maintenance instruction unit 45b instructs the remote maintenance to the remote maintenance system 50. The client 45c uses the server application of the image forming apparatus included in the remote communication system 10 via the remote session. The remote session control unit 45d controls the remote session.

The control unit 45 can implement a client in addition to the client 45c by executing the programs stored in the ROM or the storage unit 44.

The client implemented by the control unit 45 includes, for example, a Web Browser that displays a setting condition notified from the Web Server as the server application on the display 42 and instructs various kinds of settings input from the operation unit 41 to this Web Server. Additionally, the client implemented by the control unit 45 includes, for example, an application, such as a Remote APP Client, that displays a screen based on data of a screen received from a Remote APP Server as a server application on the display 42 and transmits the operation input to this screen from the operation unit 41 to this Remote APP Server.

The client implemented by the control unit 45 can be identified by an application ID. The application ID for identifying the client implemented by the control unit 45 is identical to the application ID for identifying the server application of the image forming apparatus corresponding to this client.

Figure 4:
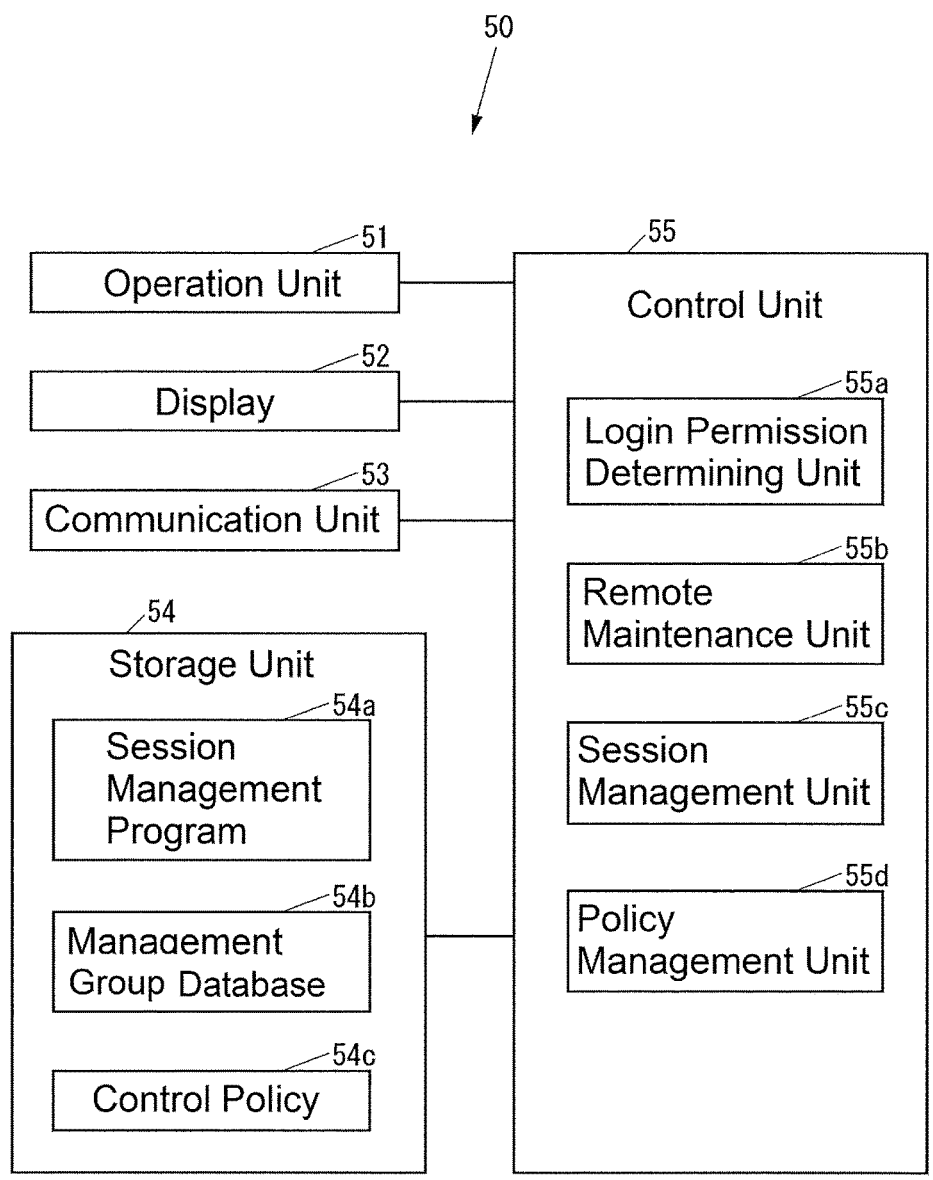
FIG. 4 illustrates a block diagram of a remote maintenance system according to the one embodiment when the remote maintenance system is configured using one server computer.

FIG. 4 illustrates a block diagram of the remote maintenance system 50 when the remote maintenance system 50 is configured using one server computer.

As illustrated in FIG. 4, the remote maintenance system 50 includes an operation unit 51, a display 52, a communication unit 53, a storage unit 54, and a control unit 55. The operation unit 51 is an input device such as a keyboard and a mouse to which various kinds of operations are input. The display 52 is a display device such as an LCD that displays various kinds of information. The communication unit 53 is a communication device that communicates with an external device via the network or directly with wire or wireless without via the network. The storage unit 54 is a non-volatile storage device such as a semiconductor memory and an HDD that stores various kinds of information. The control unit 55 controls the entire remote maintenance system 50.

The storage unit 54 stores a session management program 54a for managing the remote session.

The storage unit 54 stores a management group database 54b indicating a management group of the image forming apparatuses included in the remote communication system 10. The management group database 54b includes information indicating which management group includes which image forming apparatuses and information indicating which user belongs to which management group. Here, the management group is a unit of a contract of the remote maintenance and may be in units of image forming apparatuses or may be in units of groups of the plurality of image forming apparatuses.

The storage unit 54 stores a control policy 54c that shows which server application of the image forming apparatus is usable via the remote session.

The control unit 55 includes, for example, a CPU, a ROM that stores programs and various kinds of data, and a RAM used as a work area for the CPU. The CPU executes the programs stored in the ROM or the storage unit 54.

The control unit 55 executes a specific program stored in the ROM or the storage unit 54 to implement a login permission determining unit 55a and a remote maintenance unit 55b. The login permission determining unit 55a determines whether to permit a user login. The remote maintenance unit 55b executes the remote maintenance.

The control unit 55 executes the session management program 54a to implement a session management unit 55c that manages the remote session and a policy management unit 55d that manages the control policy 54c.

Figure 5:
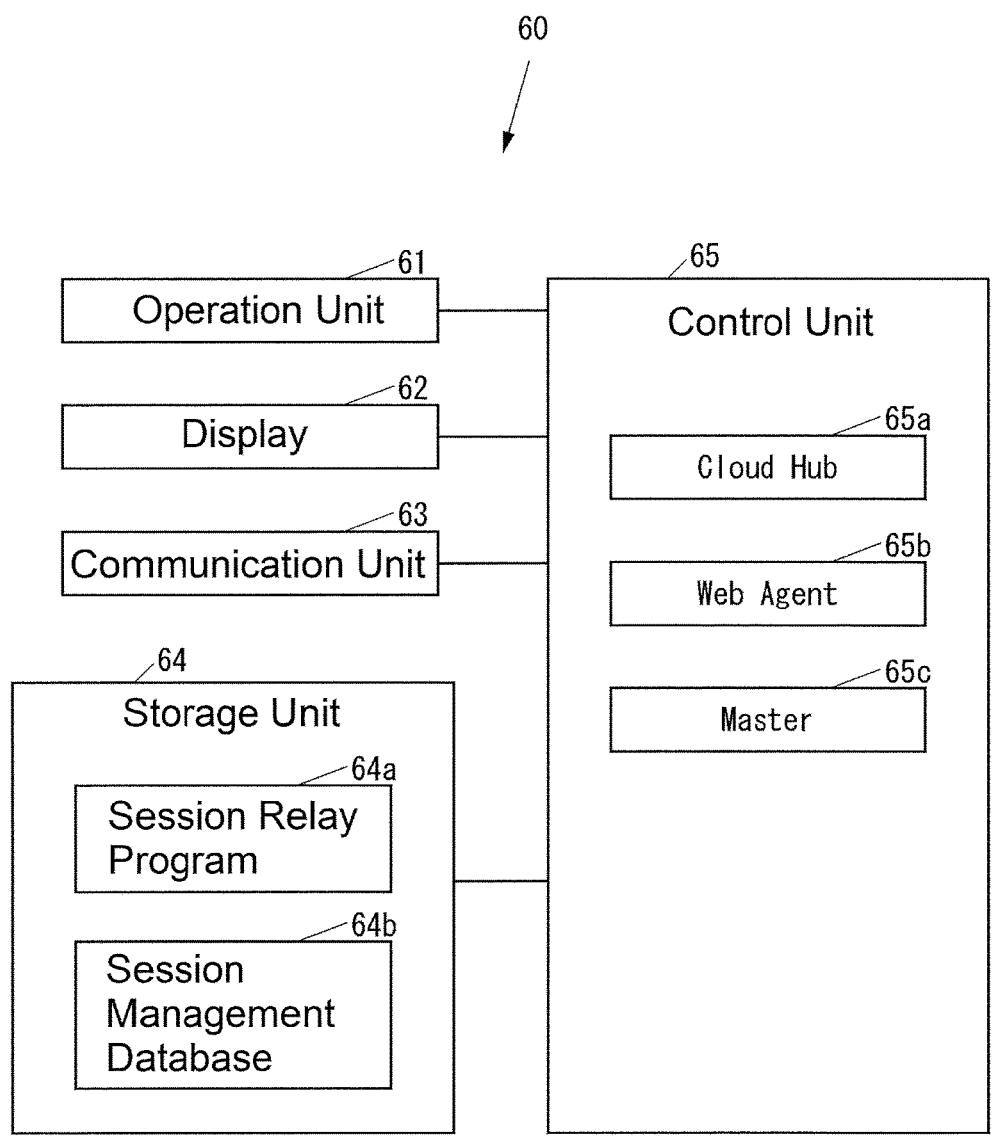
FIG. 5 illustrates a block diagram of a session relay system according to the one embodiment when the session relay system is configured using one server computer.

FIG. 5 illustrates a block diagram of the session relay system 60 when the session relay system is configured using one server computer.

As illustrated in FIG. 5, the session relay system 60 includes an operation unit 61, a display 62, a communication unit 63, a storage unit 64, and a control unit 65. The operation unit 61 is an input device such as a keyboard and a mouse to which various kinds of operations are input. The display 62 is a display device such as an LCD that displays various kinds of information. The communication unit 63 is a communication device that communicates with an external device via the network or directly with wire or wireless without via the network. The storage unit 64 is a non-volatile storage device such as a semiconductor memory and an HDD that stores various kinds of information. The control unit 65 controls the entire session relay system 60.

The storage unit 64 stores a session relay program 64a to relay the remote session.

The storage unit 64 can store a session management database 64b to store logs regarding the remote session.

The control unit 65 includes, for example, a CPU, a ROM that stores programs and various kinds of data, and a RAM used as a work area for the CPU. The CPU executes the programs stored in the ROM or the storage unit 64.

The control unit 65 executes the session relay program 64a to implement a Cloud Hub 65a and a Web Agent 65b. The Cloud Hub 65a controls a communication with the image forming apparatus included in the remote communication system 10. The Web Agent 65b controls a communication with the connection terminal included in the remote communication system 10.

The control unit 65 executes the session relay program 64a so as to ensure implementing the Cloud Hub in addition to the Cloud Hub 65a. The control unit 65 executes the session relay program 64a so as to ensure implementing the Web Agent in addition to the Web Agent 65b.

The control unit 65 executes the session relay program 64a to implement a Master 65c that determines which Cloud Hub is connected to the image forming apparatus and which Web Agent is connected to the connection terminal.

The Cloud Hub included in the session relay system 60 and the Web Agent included in the session relay system 60 are in a relationship on a one-to-one basis. That is, a count of the Cloud Hubs included in the session relay system 60 and a count of the Web Agents included in the session relay system 60 are identical.

When the image forming apparatus included in the remote communication system 10 is connected to the session relay system 60, the Master 65c determines which Cloud Hub is connected to this image forming apparatus. However, an operation of the Master 65c will not be further elaborated below.

Similarly, when the connection terminal included in the remote communication system 10 is connected to the session relay system 60, the Master 65c determines which Web Agent is connected to this connection terminal. However, an operation of the Master 65c will not be further elaborated below.

Next, an operation of the remote communication system 10 will be described.

First, an operation of the remote communication system 10 when a user of the connection terminal 40 logs in to the remote maintenance system 50 will be described.

Figure 6:
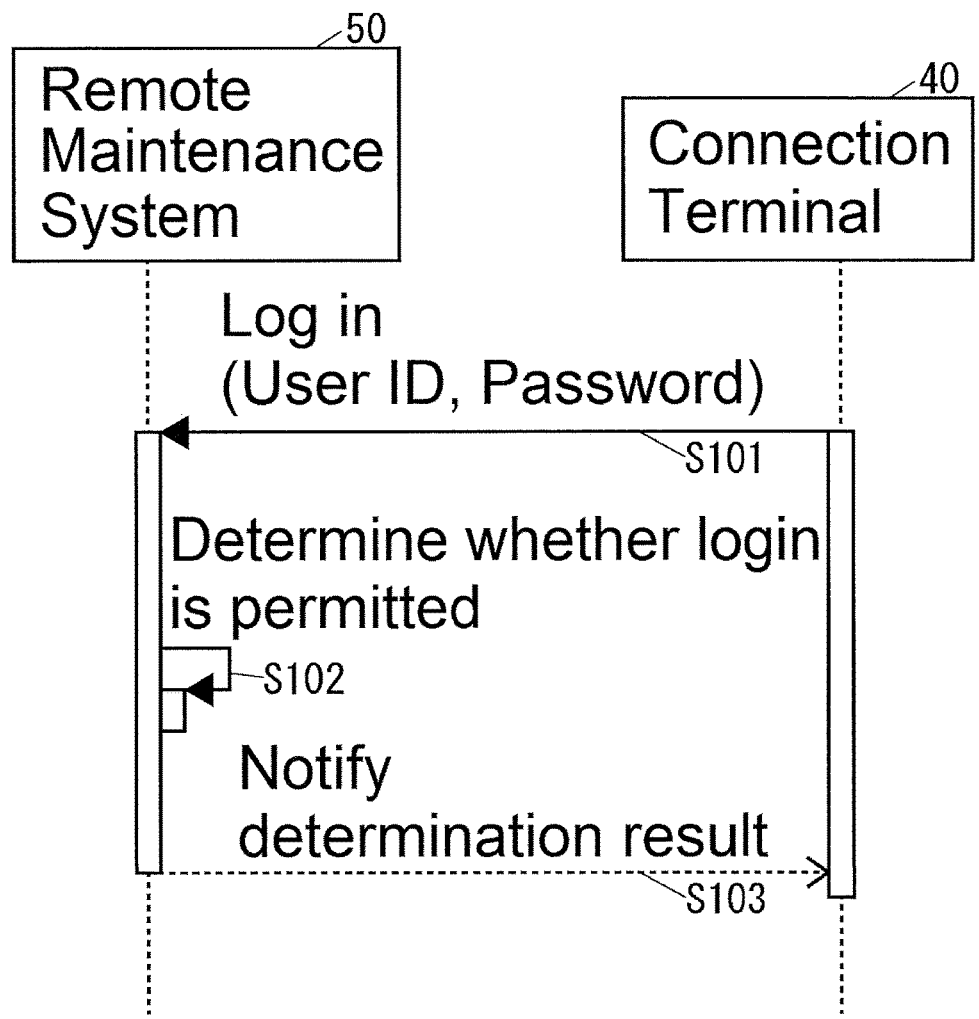
FIG. 6 illustrates an operation of the remote communication system according to the one embodiment when a user of the connection terminal logs in to the remote maintenance system.

FIG. 6 illustrates the operation of the remote communication system 10 when the user of the connection terminal 40 logs in to the remote maintenance system 50.

The user of the connection terminal 40 can instruct a login to the remote maintenance system 50 by inputting a user ID and a password via the operation unit 41. When accepting the instruction to log in to the remote maintenance system 50, the login unit 45a of the connection terminal 40 notifies the remote maintenance system 50 of the user ID and the password input via the operation unit 41 as illustrated in FIG. 6 to execute a login process to the remote maintenance system 50 (Step S101).

The login permission determining unit 55a of the remote maintenance system 50 determines whether the login of the user is permitted or not based on a combination of the user ID and the password notified from the connection terminal 40 when the connection terminal 40 requests the login (Step S102), and replies a determination result to the connection terminal 40 (Step S103).

Next, an operation of the remote communication system 10 when the remote maintenance is executed via the remote maintenance system 50 will be described.

Figure 7:
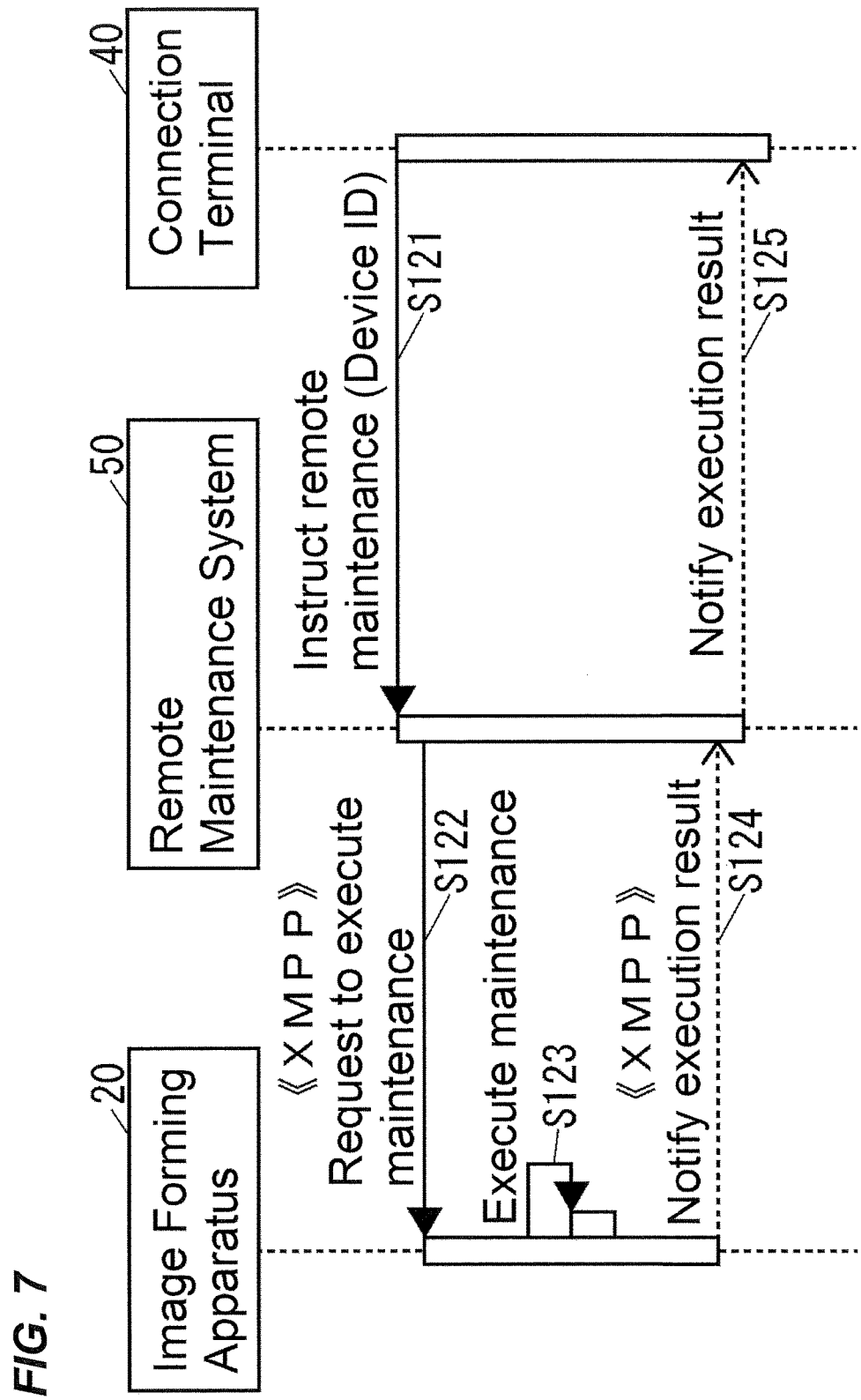
FIG. 7 illustrates an operation of the remote communication system according to the one embodiment when a remote maintenance is executed via the remote maintenance system.

FIG. 7 illustrates the operation of the remote communication system 10 when the remote maintenance is executed via the remote maintenance system 50.

When logging in to the remote maintenance system 50, the user of the connection terminal 40 can instruct the remote maintenance of a specific image forming apparatus (hereinafter described as the image forming apparatus 20 in the description of the operation illustrated in FIG. 7) via the remote maintenance system 50. This remote maintenance is instructed via the operation unit 41. When accepting the instruction of the remote maintenance via the remote maintenance system 50, the remote maintenance instruction unit 45b of the connection terminal 40 notifies the remote maintenance system 50 of a device ID of the image forming apparatus 20 instructed via the operation unit 41 as illustrated in FIG. 7 to instruct the remote maintenance instructed via the operation unit 41 to the remote maintenance system 50 (Step S121).

When the remote maintenance is instructed from the connection terminal 40, the remote maintenance unit 55b of the remote maintenance system 50 requests the image forming apparatus 20 designated as a target of the remote maintenance from the connection terminal 40 to execute the maintenance instructed from the connection terminal 40 by the XMPP (Step S122).

When the remote maintenance system 50 requests the maintenance, the control unit 28 of the image forming apparatus 20 executes the maintenance requested by the remote maintenance system 50 (Step S123), and notifies the remote maintenance system 50 of an execution result of the maintenance by the XMPP (Step S124).

When the execution result of the maintenance is notified from the image forming apparatus 20, the remote maintenance unit 55b of the remote maintenance system 50 notifies the connection terminal 40 of the execution result notified from the image forming apparatus 20 (Step S125).

Next, an operation of the remote maintenance system 50 when the control policy 54c is edited will be described.

Figure 8:
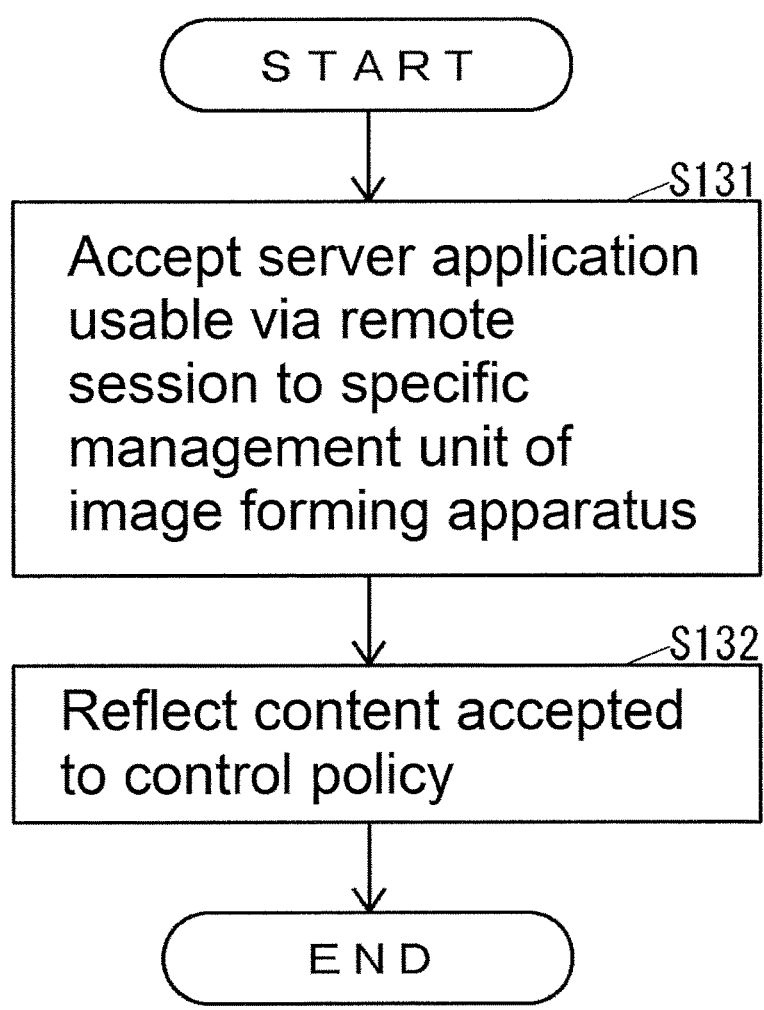
FIG. 8 illustrates an operation of the remote maintenance system according to the one embodiment when a control policy is edited.

FIG. 8 illustrates the operation of the remote maintenance system 50 when the control policy 54c is edited.

An administrator of the remote maintenance system 50 can designate a server application usable via the remote session with respect to the specific management group of the image forming apparatuses to the remote maintenance system 50 via a computer (not illustrated). When the remote maintenance system 50 receives this designation, the remote maintenance system 50 executes an operation illustrated in FIG. 8.

As illustrated in FIG. 8, the policy management unit 55d in the remote maintenance system 50 accepts the server application usable via the remote session with respect to the specific management group of the designated image forming apparatuses (Step S131).

Next, the policy management unit 55d reflects the content accepted at Step S131 to the control policy 54c (Step S132) and terminates the operation illustrated in FIG. 8.

Next, an operation of the remote communication system 10 when the remote session is started will be described.

Figure 9:
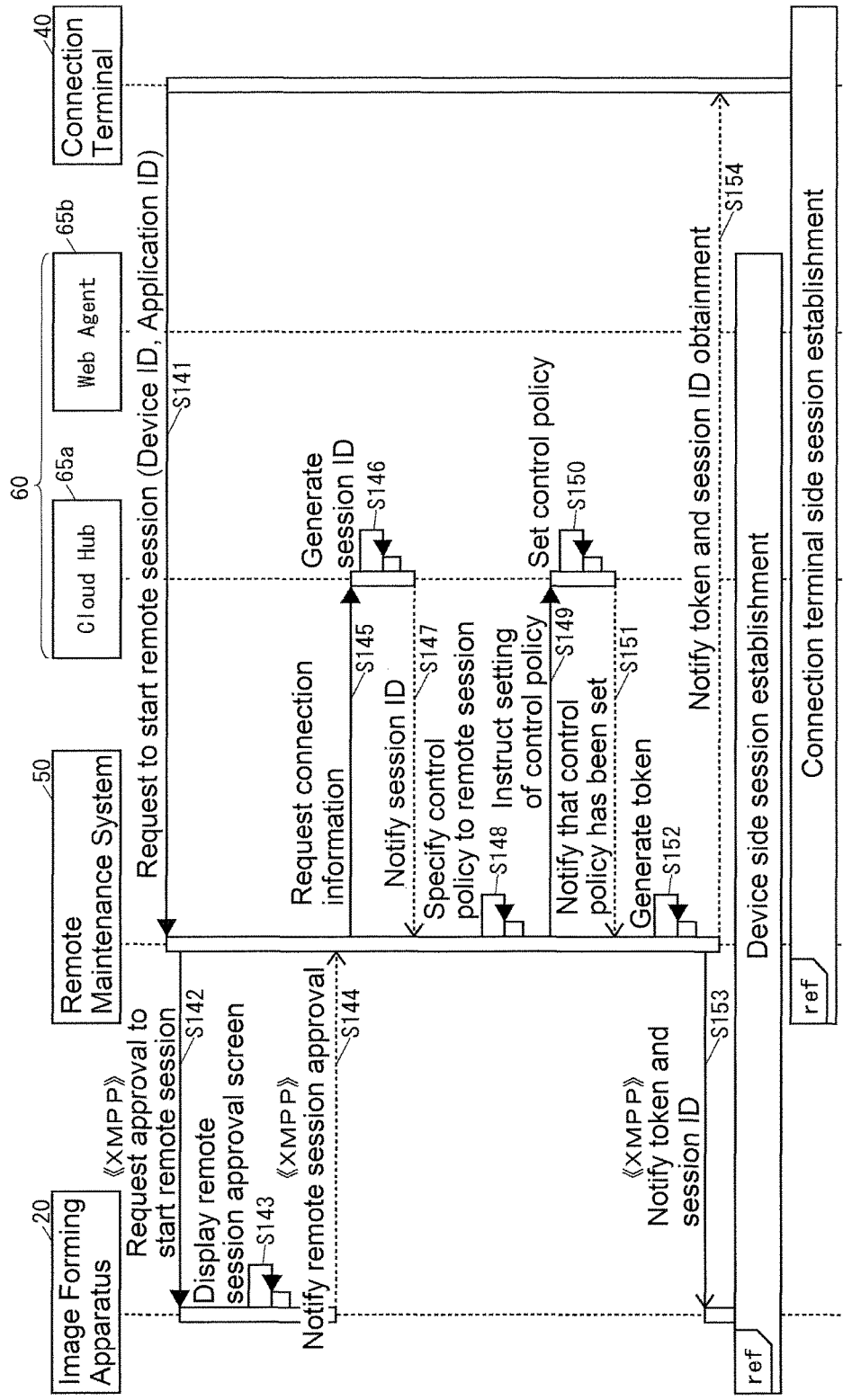
FIG. 9 illustrates an operation of the remote communication system according to the one embodiment when a remote session is started.
Figure 10:
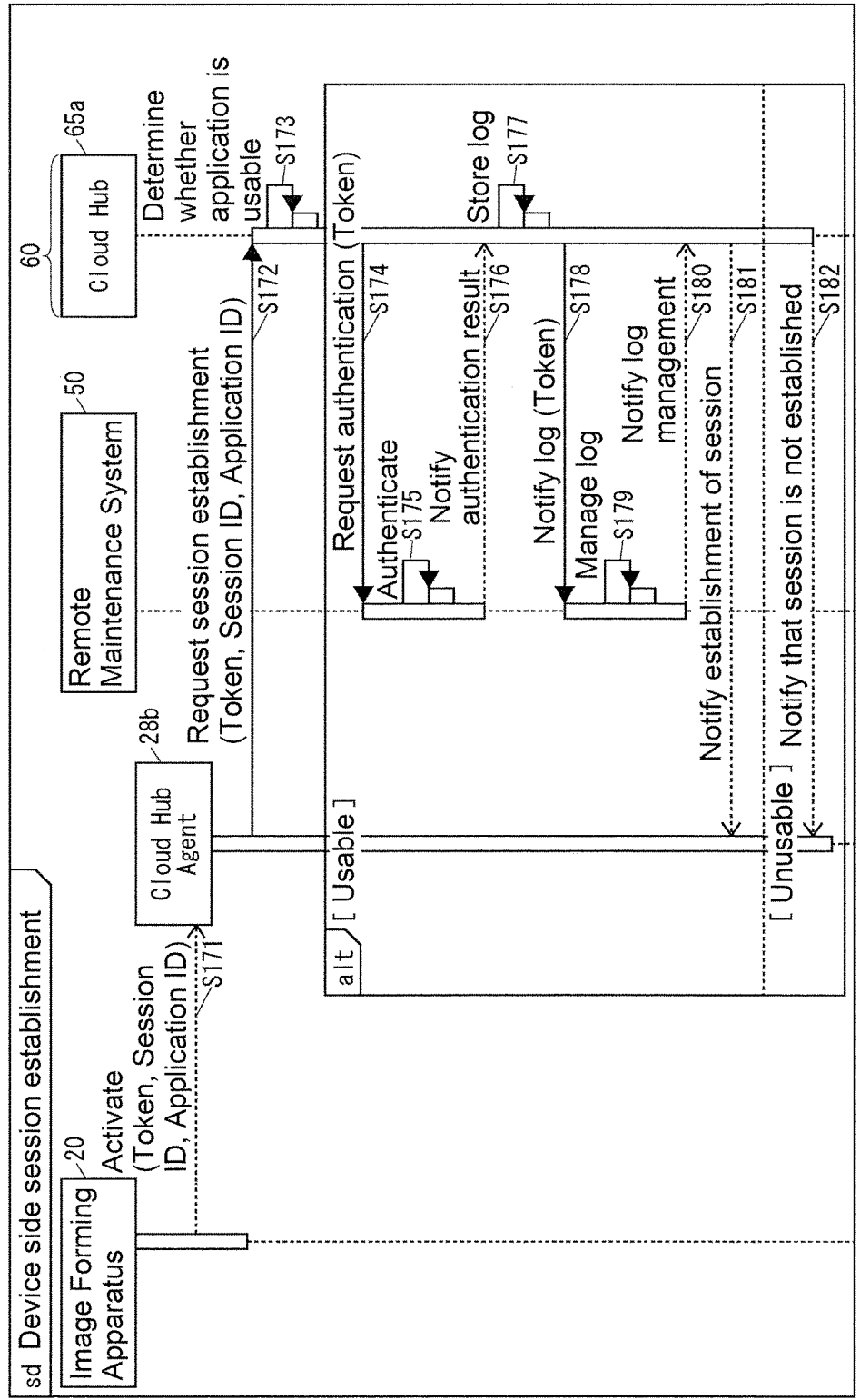
FIG. 10 illustrates a sequence diagram of a device side session establishment illustrated in FIG. 9.
Figure 11:
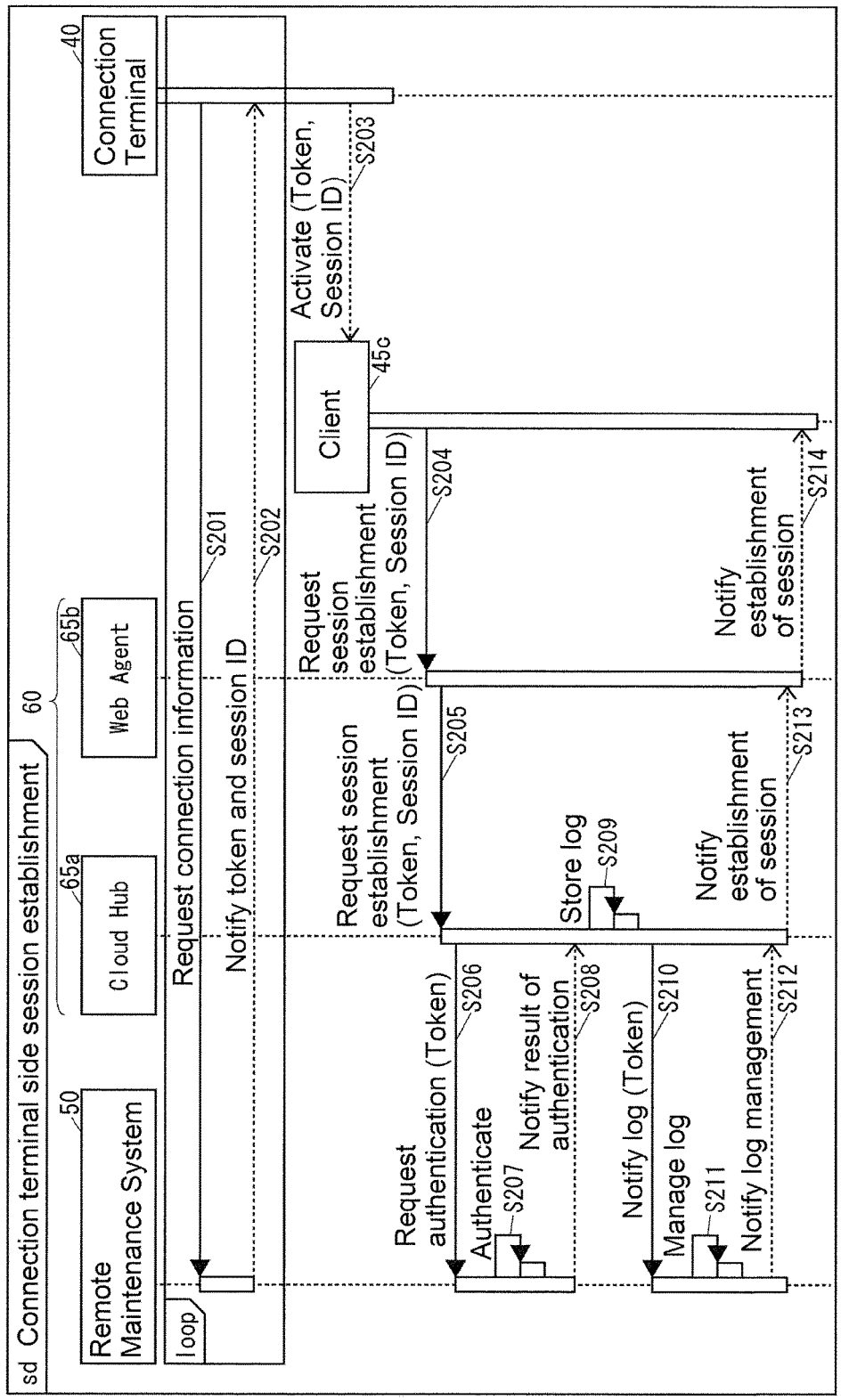
FIG. 11 illustrates a sequence diagram of a connection terminal side session establishment illustrated in FIG. 9.

FIG. 9 illustrates the operation of the remote communication system 10 when the remote session is started. FIG. 10 illustrates a sequence diagram of a device side session establishment illustrated in FIG. 9. FIG. 11 illustrates a sequence diagram of a connection terminal side session establishment illustrated in FIG. 9.

When logging in to the remote maintenance system 50, the user of the connection terminal 40 can designate a specific client (hereinafter described as the client 45c in the description of the operation illustrated in FIGS. 9 to 11) and instruct the start of the remote session with the specific image forming apparatus (hereinafter described as the image forming apparatus 20 in the description of the operation illustrated in FIGS. 9 to 11) via the operation unit 41. As illustrated in FIGS. 9 to 11, when accepting the instruction to start the remote session, the remote session control unit 45d of the connection terminal 40 notifies the remote maintenance system 50 of the device ID of the image forming apparatus 20 instructed via the operation unit 41 and an application ID of the client 45c instructed via the operation unit 41 to request the remote maintenance system 50 to start the remote session (Step S141).

It is preferred that the user of the connection terminal 40 separately inform a user of the image forming apparatus 20 of the fact that starting the remote session with the image forming apparatus 20 is desired by means of, for example, a telephone call in advance before instructing the start of the remote session with the image forming apparatus 20 via the operation unit 41 when the user of the connection terminal 40 instructs the start of the remote session with the image forming apparatus 20 via the operation unit 41.

When accepting the request of Step S141, the session management unit 55c of the remote maintenance system 50 notifies the image forming apparatus 20 specified by the device ID notified at Step S141 of the application ID notified at Step S141 to request an approval to start the remote session by the XMPP (Step S142).

When receiving the request of Step S142, the server application 28a specified by the application ID notified at Step S142 among the server applications of the image forming apparatus 20 displays a remote session approval screen 70 (see FIG. 12) that accepts the instruction whether to approve the start of the remote session on the display 22 (Step S143).

Figure 12:
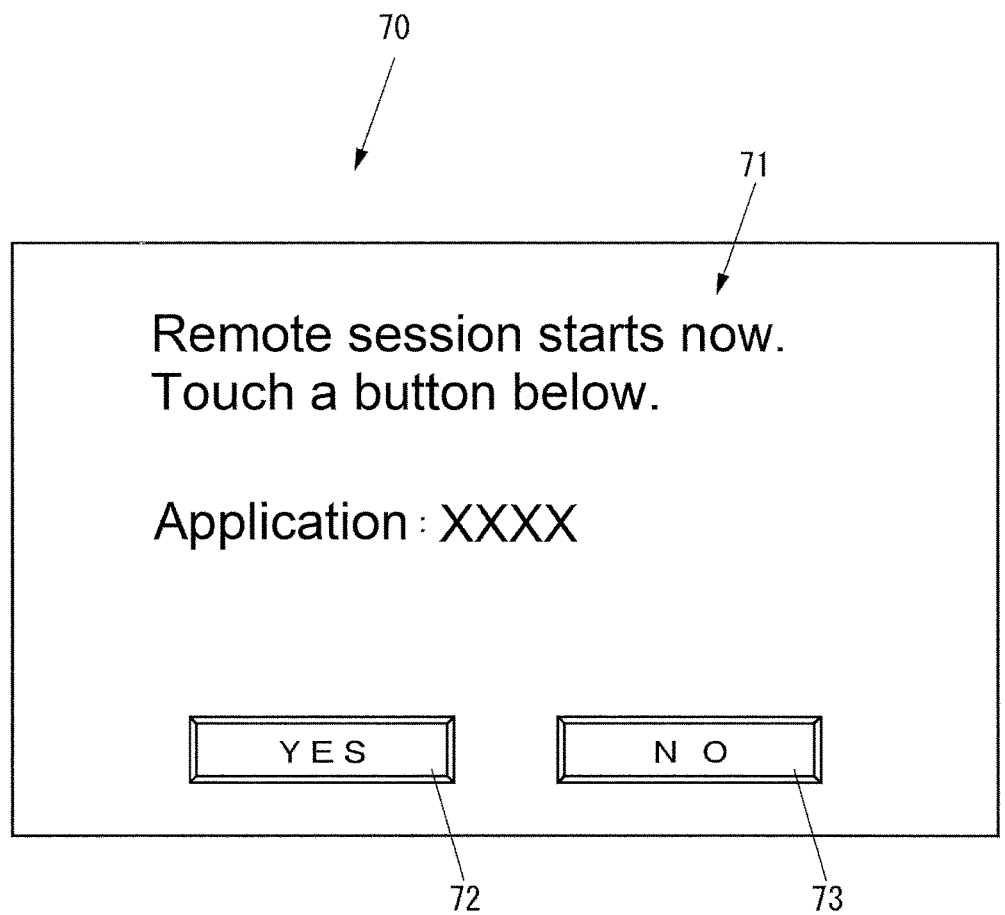
FIG. 12 illustrates an exemplary remote session approval screen displayed in the operation illustrated in FIG. 9.

FIG. 12 illustrates an example of the remote session approval screen 70.

The remote session approval screen 70 illustrated in FIG. 12 includes a message 71, a YES button 72, and a NO button 73. The message 71 queries whether the remote session is approved or not. The YES button 72 is for accepting an instruction to approve starting the remote session. The NO button 73 is for accepting an instruction not to approve starting the remote session. The user of the image forming apparatus 20 can press any one of the YES button 72 and the NO button 73 via the operation unit 21.

As illustrated in FIGS. 9 to 11, when the YES button 72 is pressed via the operation unit 21, the server application 28a notifies the remote maintenance system 50 of the fact that the remote session is approved by the XMPP (Step S144).

Although the illustration is omitted, when the NO button 73 is pressed to the remote session approval screen 70 displayed on the display 22 via the operation unit 21 at Step S143, the remote communication system 10 operates as follows. First, the server application 28a of the image forming apparatus 20 notifies the remote maintenance system 50 of the fact that the remote session has failed to be approved by the XMPP. Next, the session management unit 55c of the remote maintenance system 50 notifies the connection terminal 40 of the fact that the remote session has failed to be approved. Then, the remote session control unit 45d of the connection terminal 40 displays the fact that the remote session has failed to be approved on the display 42.

When receiving the notification of Step S144, the session management unit 55c of the remote maintenance system 50 requests connection information from the session relay system 60 by an Application Program Interface (API) (Step S145).

When receiving the request of Step S145, the Cloud Hub 65a of the session relay system 60 generates a session ID for the session relay system 60 to identify the communication made by this remote session (Step S146), and notifies the remote maintenance system 50 of the generated session ID as the connection information using the API (Step S147). As the session ID, random identification information is employed. The random identification information includes, for example, a random number sequence generated by a hash algorithm, such as a Hash-based Message Authentication Code (HMAC), which is BASE64 encoded so as to be handled on a Hypertext Transfer Protocol (HTTP).

When the session ID is notified at Step S147, the session management unit 55c of the remote maintenance system 50 specifies the control policy to the current remote session based on the image forming apparatus as a target for the current remote session, the management group database 54b, and the control policy 54c (Step S148) and instructs the session relay system 60 to set the control policy specified at Step S148 to the current remote session using the API (Step S149).

When the Cloud Hub 65a of the session relay system 60 receives the instruction at Step S149, the Cloud Hub 65a sets the control policy corresponding to the instruction at Step S149 to the current remote session (Step S150) and notifies the remote maintenance system 50 of the fact that the control policy has been set (Step S151).

When the notification at Step S151 is received, the session management unit 55c of the remote maintenance system 50 generates a token for the remote maintenance system 50 to recognize a valid duration of the remote session (Step S152), and notifies the image forming apparatus 20 of the generated token and the session ID notified at Step S147 by the XMPP (Step S153).

Next, the session management unit 55c notifies the connection terminal 40 of the fact that the token and the session ID are obtained (Step S154).

When the token and the session ID are notified at Step S153, the server application 28a of the image forming apparatus 20 starts the Cloud Hub Agent 28b to which the token and the session ID notified at Step S153 and the application ID as identification information of the server application 28a itself are set (Step S171).

Next, the Cloud Hub Agent 28b notifies the session relay system 60 of the set token, session ID, and application ID to request the session relay system 60 to establish the session (Step S172).

When the Cloud Hub 65a associated with the session ID notified at Step S172 among the Cloud Hubs of the session relay systems 60 receives the request of Step S172, the Cloud Hub 65a determines whether the server application 28a is usable via the remote session based on the control policy to the current remote session set at Step S150 and the identification information of the server application as a target for the current remote session, namely, the application ID notified at Step S172 (Step S173).

When the Cloud Hub 65a determines that the server application 28a is usable via the remote session at Step S173, the Cloud Hub 65a requests an authentication with the token notified at Step S172 to the remote maintenance system 50 using the API (Step S174). Accordingly, the session management unit 55c of the remote maintenance system 50 executes the authentication requested at Step S174 (Step S175) and notifies the result of authentication to the session relay system 60 using the API (Step S176).

When a successful authentication is notified at Step S176, the Cloud Hub 65a of the session relay system 60 stores a log indicating the start of the session with the image forming apparatus 20 in the session management database 64b (Step S177), and notifies the remote maintenance system 50 of the log stored at Step S177 together with the token, using the API (Step S178). Accordingly, the session management unit 55c of the remote maintenance system 50 manages the log notified at Step S178 as a log of the remote session identified by the token notified at Step S178 (Step S179), and replies the fact that this log is managed to the session relay system 60, using the API (Step S180).

When the successful authentication is notified at Step S176, the Cloud Hub 65a of the session relay system 60 notifies the image forming apparatus 20 of the fact that the session with the image forming apparatus 20 is established (Step S181). That is, an HTTP-based WebSocket connection is established between the image forming apparatus 20 and the session relay system 60.

When the Cloud Hub 65a determines that the server application 28a is unusable via the remote session at Step S173, the Cloud Hub 65a notifies the image forming apparatus 20 of the fact that the session with the image forming apparatus 20 is not established (Step S182). That is, the HTTP-based WebSocket connection is not established between the image forming apparatus 20 and the session relay system 60.

After the process at Step S141, the remote session control unit 45d of the connection terminal 40 requests the connection information to the remote maintenance system 50 by polling until the connection information can be obtained from the remote maintenance system 50 (Step S201).

When the token is already generated at Step S152 when the session management unit 55c of the remote maintenance system 50 receives the request of Step S201, the session management unit 55c of the remote maintenance system 50 notifies the connection terminal 40 of this token and the session ID notified from the session relay system 60 at Step S147 as the connection information (Step S202).

When the token and the session ID are notified at Step S202, the remote session control unit 45d of the connection terminal 40 activates the client 45c to which the token and the session ID notified at Step S202 are set (Step S203).

Next, the client 45c notifies the session relay system 60 of the set token and session ID to request the session relay system 60 to establish the session (Step S204).

When receiving the request of Step S204, the Web Agent 65b associated with the session ID notified at Step S204 among the Web Agents of the session relay system 60 notifies the Cloud Hub 65a of the token and the session ID notified at Step S204 to request the Cloud Hub 65a to establish the session (Step S205).

When receiving the request of Step S205, the Cloud Hub 65a of the session relay system 60 requests the remote maintenance system 50 to execute an authentication by the token notified at Step S205, using the API (Step S206). Accordingly, the session management unit 55c of the remote maintenance system 50 executes the authentication requested at Step S206 (Step S207), and notifies the session relay system 60 of a result of the authentication using the API (Step S208).

When a successful authentication is notified at Step S208, the Cloud Hub 65a of the session relay system 60 stores a log indicating the start of the session with the connection terminal 40 in the session management database 64b (Step S209), and notifies the remote maintenance system 50 of the log stored at Step S209 together with the token, using the API (Step S210). Accordingly, the session management unit 55c of the remote maintenance system 50 manages the log notified at Step S210 as a log of the remote session identified by the token notified at Step S210 (Step S211), and replies the fact that this log is managed to the session relay system 60, using the API (Step S212).

When the successful authentication is notified at Step S208, the Cloud Hub 65a of the session relay system 60 notifies the Web Agent 65b of the fact that the session with the connection terminal 40 is established (Step S213). Accordingly, the Web Agent 65b notifies the connection terminal 40 of the fact that the session with the connection terminal 40 is established (Step S214). That is, an HTTP-based WebSocket connection is established between the connection terminal 40 and the session relay system 60.

When the server application 28a is determined to be unusable via the remote session at Step S173 regarding the remote session specified with the session ID notified at Step S205 before the HTTP-based WebSocket connection is established between the connection terminal 40 and the session relay system 60, the Cloud Hub 65a does not establish this WebSocket connection. Additionally, when the server application 28a is determined to be unusable via the remote session at Step S173 regarding the remote session specified with the session ID notified at Step S205 after the HTTP-based WebSocket connection has been established between the connection terminal 40 and the session relay system 60, the Cloud Hub 65a disconnects this WebSocket connection.

The session relay system 60 associates the WebSocket connection established with the image forming apparatus 20 by the operation illustrated in FIGS. 9 to 11 with the WebSocket connection established with the connection terminal 40 by the operation illustrated in FIGS. 9 to 11, using the session ID. Accordingly, the remote session is established by the operations illustrated in FIGS. 9 to 11.

The following describes an operation of the remote communication system 10 when the image forming apparatus 20 operates corresponding to the request from the connection terminal 40 via the remote session.

Figure 13:
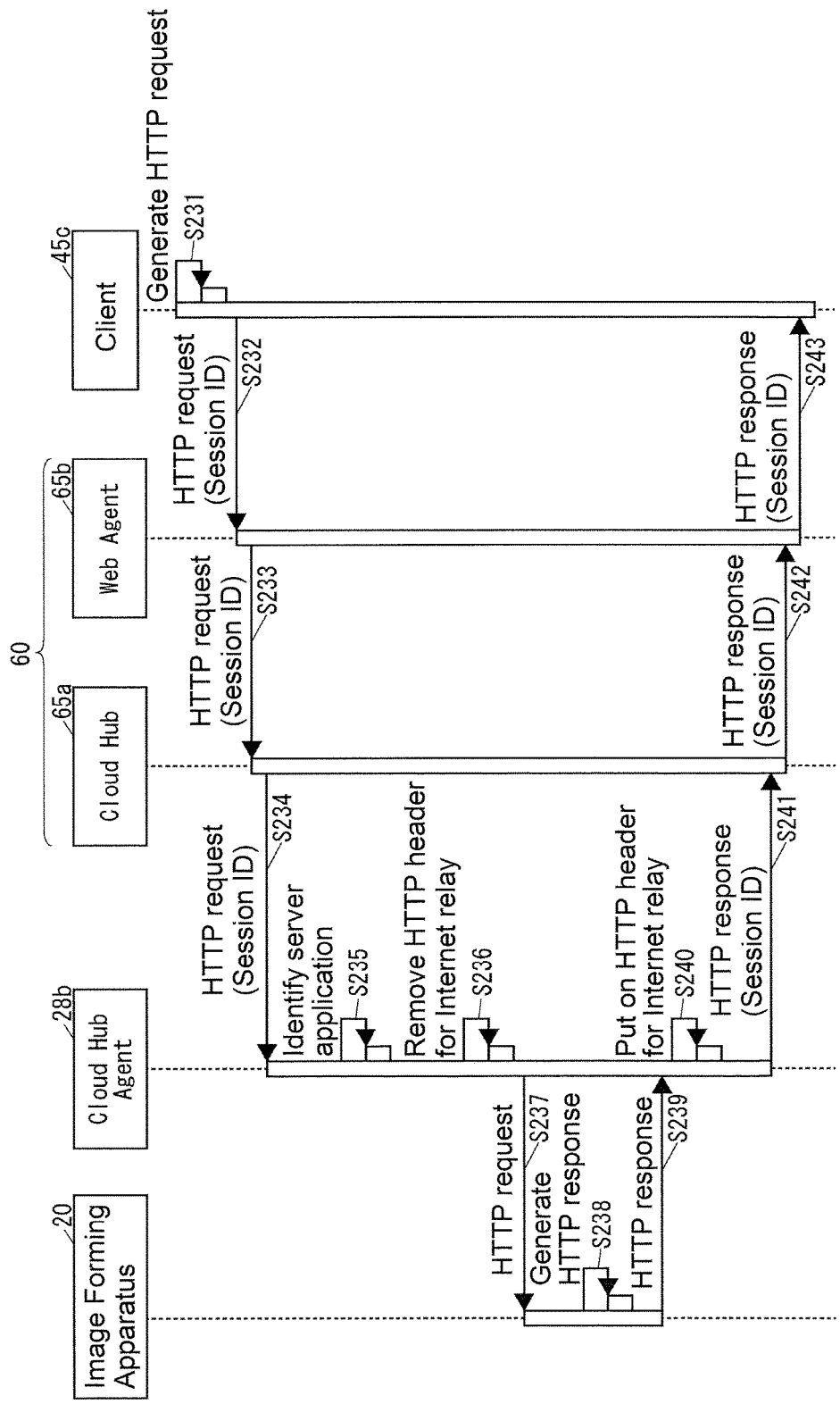
FIG. 13 illustrates an operation of the remote communication system according to the one embodiment when the image forming apparatus operates corresponding to a request from the connection terminal via the remote session.

FIG. 13 illustrates the operation of the remote communication system 10 when the image forming apparatus 20 operates corresponding to the request from the connection terminal 40 via the remote session.

When the remote session is established by the operation illustrated in FIGS. 9 to 11, the user of the connection terminal 40 can instruct a request toward the image forming apparatus 20 via the operation unit 41. When accepting the instruction to the request toward the image forming apparatus 20, the client 45c of the connection terminal 40 generates an HTTP request for notifying the request instructed via the operation unit 41 as illustrated in FIG. 13 (Step S231).

Here, a structure of the HTTP request generated at Step S232 will be described.

Figure 14A:
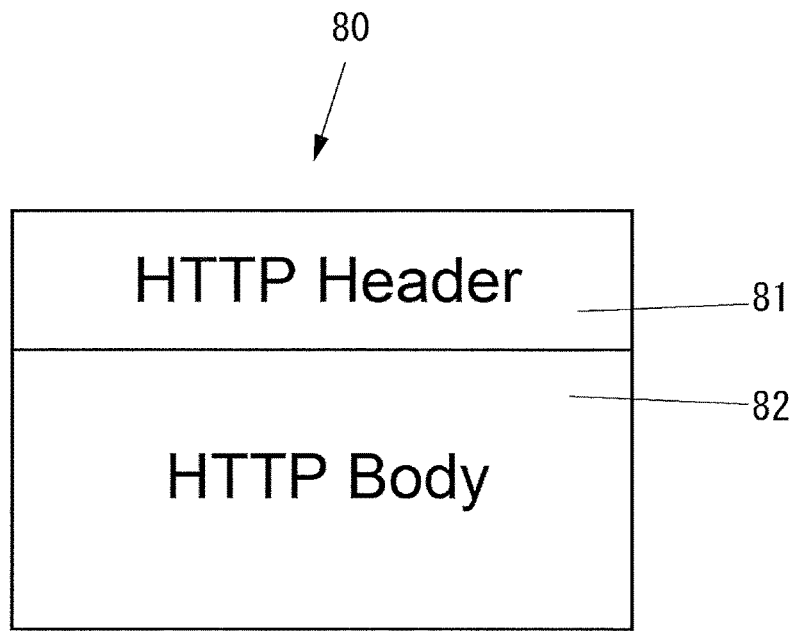
FIG. 14A illustrates HTTP data processed by a server application in the operation illustrated in FIG. 13.
Figure 14B:
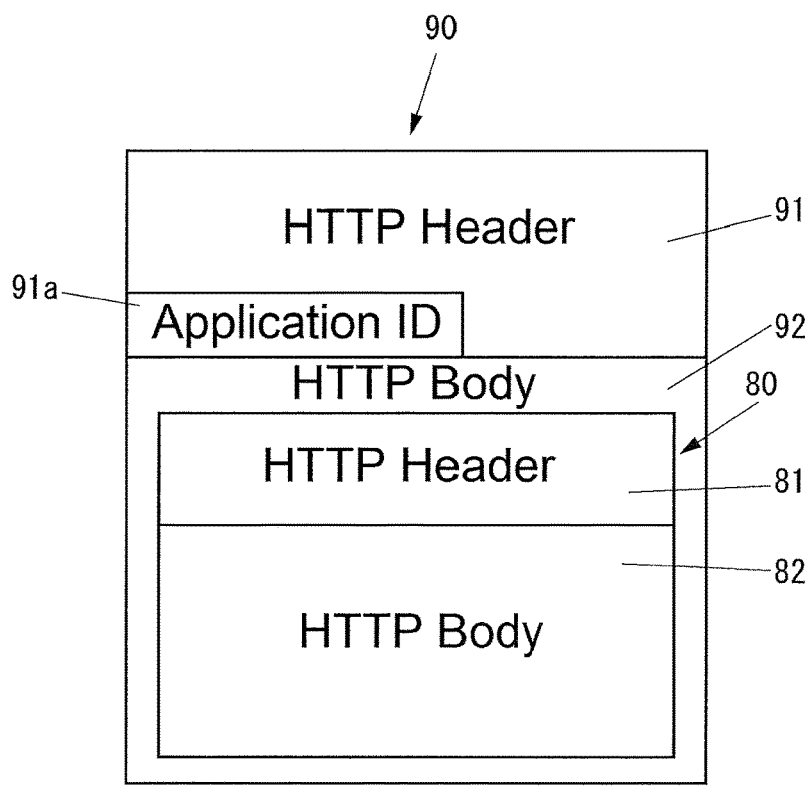
FIG. 14B illustrates HTTP data for relaying the HTTP data illustrated in FIG. 14A on the Internet.

FIG. 14A illustrates HTTP data 80 processed by the server application 28a. FIG. 14B illustrates HTTP data 90 for relaying the HTTP data 80 illustrated in FIG. 14A on the Internet.

As illustrated in FIGS. 14A and 14B, the HTTP data 80 includes an HTTP header 81 and an HTTP body 82. The HTTP data 90 includes an HTTP header 91 for relaying on the Internet and the HTTP data 80 as an HTTP body 92. The HTTP header 91 includes an application ID 91a for identifying the server application 28a.

The client 45c generates HTTP data having a structure similar to that of the HTTP data 90 illustrated in FIG. 14B as the HTTP request for notifying the request instructed via the operation unit 41. Here, the session ID is stored in a position equivalent to the HTTP header 91.

As illustrated in FIG. 13, the client 45c of the connection terminal 40 transmits the HTTP request generated at Step S231 to the session relay system 60 by the WebSocket connection (Step S232).

When the HTTP request is transmitted at Step S232, the Web Agent 65b associated with the session ID included in the HTTP request transmitted at Step S232 among the Web Agents of the session relay system 60 passes this HTTP request to the Cloud Hub 65a (Step S233). Accordingly, the Cloud Hub 65a transmits this HTTP request to the image forming apparatus 20 by the WebSocket connection corresponding to the session ID included in this HTTP request (Step S234).

When the HTTP request is transmitted at Step S234, the Cloud Hub Agent 28b of the image forming apparatus 20 identifies the server application 28a corresponding to the application ID included in this HTTP request (Step S235).

Next, the Cloud Hub Agent 28b generates an HTTP request that is made by removing the HTTP header for relaying on the Internet from the HTTP request transmitted at Step S234 (Step S236). Here, the HTTP request generated at Step S236 is HTTP data having a structure similar to that of the HTTP data 80 illustrated in FIG. 14A.

Next, the Cloud Hub Agent 28b passes the HTTP request generated at Step S236 to the server application 28a identified at Step S235 (Step S237).

When the HTTP request is passed at Step S237, the server application 28a generates an HTTP response corresponding to this HTTP request (Step S238). Here, the HTTP response generated at Step S238 is HTTP data having a structure similar to that of the HTTP data 80 illustrated in FIG. 14A.

Next, the server application 28a passes the HTTP response generated at Step S238 to the Cloud Hub Agent 28b (Step S239).

When the HTTP response is passed at Step S239, the Cloud Hub Agent 28b generates an HTTP response that is made by putting on the HTTP header for relaying on the Internet to the HTTP response passed at Step S239 (Step S240). Here, the HTTP response generated at Step S240 is HTTP data having a structure similar to that of the HTTP data 90 illustrated in FIG. 14B. The session ID is stored in a position equivalent to the HTTP header 91.

The Cloud Hub Agent 28b transmits the HTTP response generated at Step S240 to the session relay system 60 by the WebSocket connection (Step S241).

When the HTTP response is transmitted at Step S241, the Cloud Hub 65a associated with the session ID included in the HTTP response transmitted at Step S241 among the Cloud Hubs in the session relay system 60 passes this HTTP response to the Web Agent 65b (Step S242). Accordingly, the Web Agent 65b transmits this HTTP response to the connection terminal 40 by the WebSocket connection corresponding to the session ID included in this HTTP response (Step S243).

Accordingly, the client 45c of the connection terminal 40 can receive the HTTP response transmitted at Step S243.

Next, an operation of the remote communication system 10 when the remote session is terminated will be described.

Figure 15:
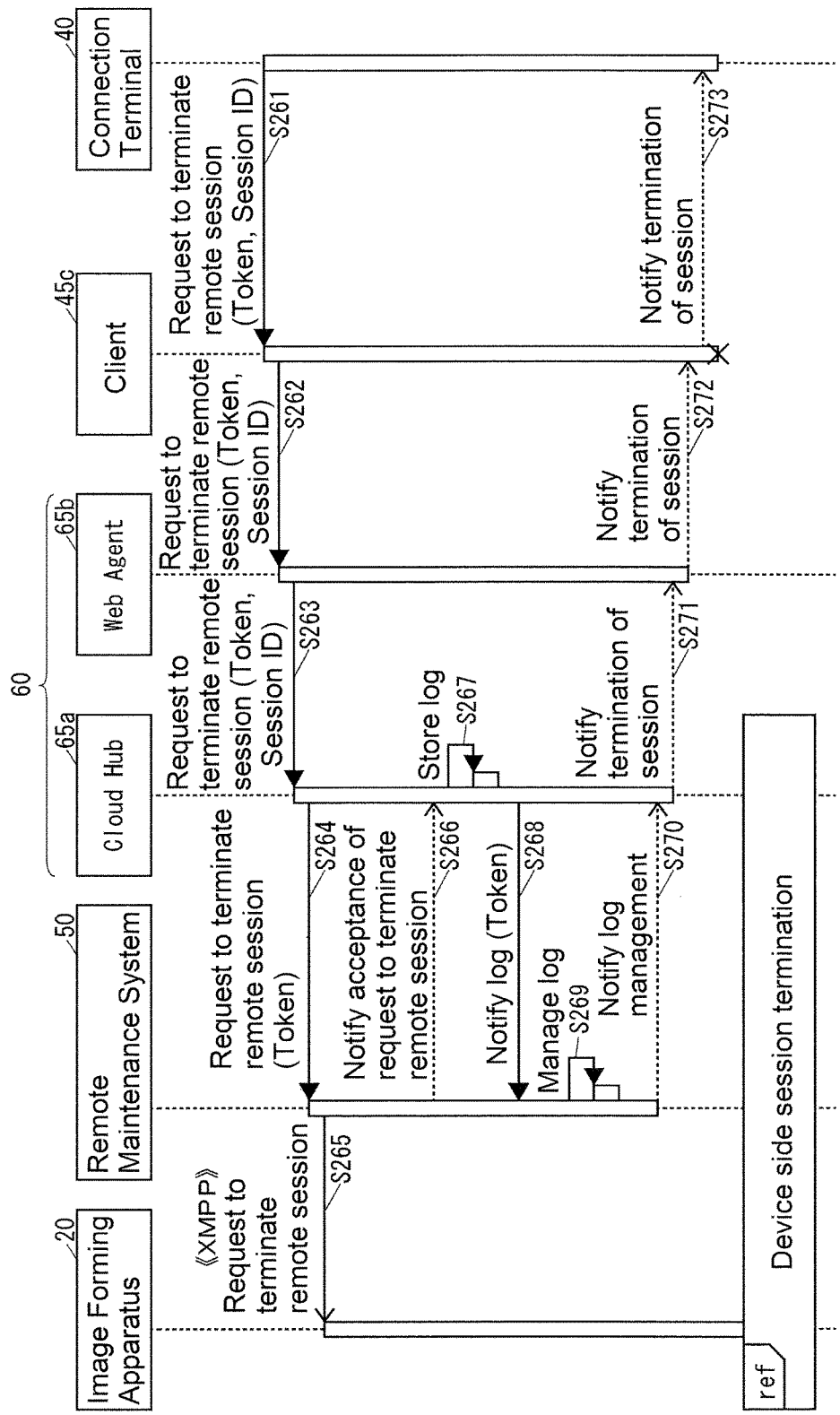
FIG. 15 illustrates an operation of the remote communication system according to the one embodiment when the remote session is terminated.
Figure 16:
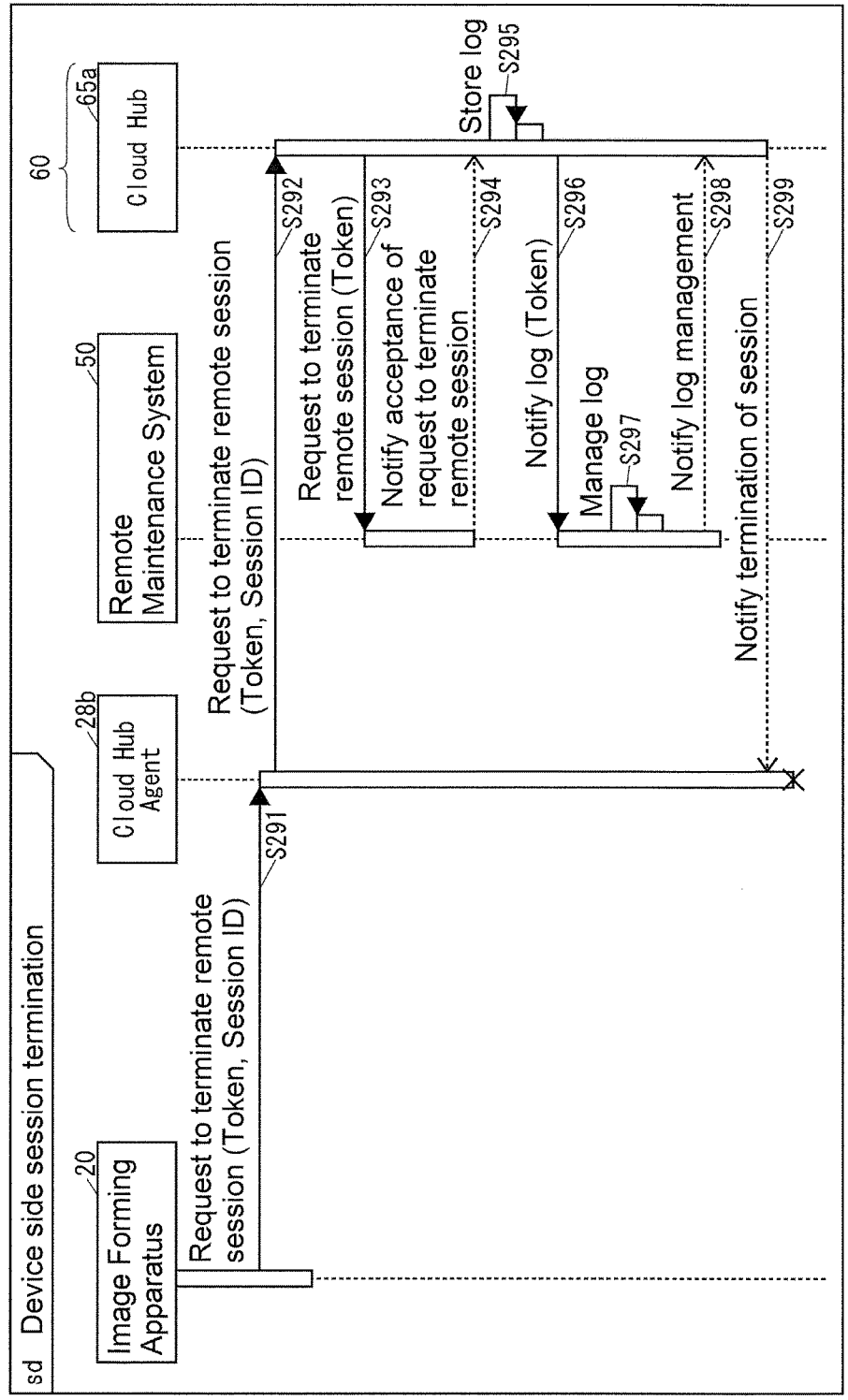
FIG. 16 illustrates a sequence diagram of a device side session termination illustrated in FIG. 15.

FIG. 15 illustrates the operation of the remote communication system 10 when the remote session is terminated. FIG. 16 illustrates a sequence diagram of a device side session termination illustrated in FIG. 15.

The user of the connection terminal 40 can instruct termination of the remote session with a specific server application (hereinafter described as the server application 28a in the description of the operation illustrated in FIGS. 15 and 16) of a specific image forming apparatus (hereinafter described as the image forming apparatus 20 in the description of the operation illustrated in FIGS. 15 and 16) via the operation unit 41. When accepting the instruction to terminate the remote session, the remote session control unit 45d of the connection terminal 40 notifies the client 45c of the token and the session ID of the remote session instructed via the operation unit 41 as illustrated in FIGS. 15 and 16 to request the client 45c to terminate the remote session (Step S261). Accordingly, the client 45c requests the session relay system 60 to terminate the remote session requested at Step S261 by the WebSocket connection (Step S262).

When the termination of the remote session is requested at Step S262, the Web Agent 65b associated with a session ID included in the request at Step S262 among the Web Agents of the session relay system 60 passes this request to the Cloud Hub 65a (Step S263). Accordingly, the Cloud Hub 65a requests the remote maintenance system 50 to terminate the remote session identified by the token included in this request, using the API (Step S264).

When receiving the request of Step S264, the session management unit 55c of the remote maintenance system 50 requests the image forming apparatus 20 as a target of the remote session, which is a target of the request at Step S264, to terminate this remote session by the XMPP (Step S265).

Next, the session management unit 55c notifies the fact that the request to terminate the remote session is accepted to the session relay system 60, using the API (Step S266).

When the acceptance of the request to terminate the remote session is notified at Step S266, the Cloud Hub 65a of the session relay system 60 stores a log indicating the termination of the session with the connection terminal 40 in the session management database 64b (Step S267), and notifies the remote maintenance system 50 of the log stored at Step S267 together with the token, using the API (Step S268). Accordingly, the session management unit 55c of the remote maintenance system 50 manages the log notified at Step S268 as a log of the remote session identified by the token notified at Step S268 (Step S269), and replies the fact that this log is managed to the session relay system 60, using the API (Step S270).

When receiving the reply at Step S270, the Cloud Hub 65a of the session relay system 60 notifies the Web Agent 65b of the termination of the WebSocket connection between the connection terminal 40 and the session relay system 60 (Step S271). Accordingly, the Web Agent 65b notifies the connection terminal 40 of the termination of the WebSocket connection between the connection terminal 40 and the session relay system 60 (Step S272).

When receiving the notification at Step S272, the client 45c of the connection terminal 40 notifies the remote session control unit 45d of the termination of the WebSocket connection between the connection terminal 40 and the session relay system 60 (Step S273), and terminates its operation.

Accordingly, the remote session control unit 45d can, for example, display the fact that the WebSocket connection between the connection terminal 40 and the session relay system 60 is terminated on the display 42.

When receiving the request at Step S265, the server application 28a as the target of the remote session as the target of the request received at Step S265 among the server applications of the image forming apparatus 20 notifies the Cloud Hub Agent 28b of the token and the session ID of this remote session to request the Cloud Hub Agent 28b to terminate the remote session (Step S291). Accordingly, the Cloud Hub Agent 28b requests the session relay system 60 to terminate the remote session requested at Step S291 by the WebSocket connection (Step S292).

When receiving the request of Step S292, the Cloud Hub 65a of the session relay system 60 requests the remote maintenance system 50 to terminate the remote session identified by the token included in this request, using the API (Step S293).

When receiving the request of Step S293, the session management unit 55c of the remote maintenance system 50 notifies the session relay system 60 of the fact that the request to terminate the remote session is accepted, using the API (Step S294).

When the acceptance of the request to terminate the remote session is notified at Step S294, the Cloud Hub 65a of the session relay system 60 stores a log indicating the termination of the session with the image forming apparatus 20 in the session management database 64b (Step S295), and notifies the remote maintenance system 50 of the log stored at Step S295 together with the token, using the API (Step S296). Accordingly, the session management unit 55c of the remote maintenance system 50 manages the log notified at Step S296 as a log of the remote session identified by the token notified at Step S296 (Step S297), and replies the fact that this log is managed to the session relay system 60, using the API (Step S298).

When receiving the reply at Step S298, the Cloud Hub 65a of the session relay system 60 notifies the image forming apparatus 20 of the termination of the WebSocket connection between the image forming apparatus 20 and the session relay system 60 (Step S299).

When receiving the notification at Step S299, the Cloud Hub Agent 28b of the image forming apparatus 20 terminates its operation.

When the session management unit 55c of the remote maintenance system 50 confirms both that the log indicating the termination of the session between the image forming apparatus 20 and the session relay system 60 is notified from the session relay system 60 and that the log indicating the termination of the session between the connection terminal 40 and the session relay system 60 is notified from the session relay system 60, the session management unit 55c of the remote maintenance system 50 determines that the remote session between the image forming apparatus 20 and the connection terminal 40 via the session relay system 60 is terminated. When the session management unit 55c determines that the remote session between the image forming apparatus 20 and the connection terminal 40 via the session relay system 60 is not terminated, the session management unit 55c does not permit to establish a new remote session between the image forming apparatus 20 and the connection terminal 40 via the session relay system 60.

As described above, in the remote communication control system 15, the image forming apparatus 20 and the connection terminal 40 located outside the network to which the image forming apparatus 20 belongs are not directly connected but establish the remote session relayed by the session relay system 60. This can improve the security when the image forming apparatus 20 is controlled from the connection terminal 40 located outside the network to which the image forming apparatus 20 belongs.

In the remote communication system 10, the image forming apparatus 20 establishes the WebSocket connection, which uses the session ID, with the session relay system 60 (Steps S171 to S181), the connection terminal 40 establishes the WebSocket connection, which uses the session ID, with the session relay system 60 (Steps S201 to S214), and the session relay system 60 relays the remote session by associating the connection established with the connection terminal 40 with the connection established with the image forming apparatus 20, using the session ID (Steps S231 to S243). With this configuration, in the remote communication system 10, only the connection terminal 40 notified of the session ID from the remote maintenance system 50 among the connection terminals located outside the network to which the image forming apparatus 20 belongs establishes the remote session with the image forming apparatus 20 relayed by the session relay system 60, thereby ensuring an improved security when the image forming apparatus 20 is controlled from the connection terminal 40 located outside the network to which the image forming apparatus 20 belongs.

In the remote communication system 10, the session ID used by the WebSocket connection established between the image forming apparatus 20 and the session relay system 60 and the session ID used by the WebSocket connection established between the connection terminal 40 and the session relay system 60 are identical session IDs. With this configuration, it is not necessary for the remote communication system 10 to associate two mutually different session IDs in the session relay system 60, thereby ensuring a simplified process of the session ID in the session relay system 60. The session ID used by the WebSocket connection established between the image forming apparatus 20 and the session relay system 60 and the session ID used by the WebSocket connection established between the connection terminal 40 and the session relay system 60 may be mutually different as long as they are associated with one another in the session relay system 60.

In the remote communication system 10, at least one of the WebSocket connection established between the session relay system 60 and the connection terminal 40 and the WebSocket connection established between the session relay system 60 and the image forming apparatus 20 may be a connection with encrypted communication, such as a Secure Sockets Layer (SSL). With this configuration, the remote communication system 10 has at least a part of a path of the remote session between the connection terminal 40 and the image forming apparatus 20 relayed by the session relay system 60 encrypted, thereby ensuring reducing an occurrence of an invalid use, such as cracking, to the image forming apparatus 20.

In the remote communication system 10, the remote maintenance system 50 accepts the request (Step S141) to start the remote session from the connection terminal 40 when the user of the connection terminal 40 is logged in to the remote maintenance system 50. The remote maintenance system 50 does not execute the notification (Step S153) of the session ID to the image forming apparatus 20 and the notification (Step S202) of the session ID to the connection terminal 40 when the request to start the remote session is not accepted from the connection terminal 40. With this configuration, the remote communication system 10 has the remote session between the connection terminal 40 and the image forming apparatus 20 relayed by the session relay system 60 established only when the user of the connection terminal 40 can log in to the remote maintenance system 50, thereby ensuring the improved security of this remote session.

In the remote communication system 10, the remote maintenance system 50 does not execute the notification (Step S153) of the session ID to the image forming apparatus 20 and the notification (Step S202) of the session ID to the connection terminal 40 when the start of the remote session is not approved from the user of the image forming apparatus 20. With this configuration, the remote communication system 10 has the remote session between the connection terminal 40 and the image forming apparatus 20 relayed by the session relay system 60 established only when the start of the remote session is approved by the user of the image forming apparatus 20, thereby ensuring the improved security of this remote session. The remote maintenance system 50 may be configured not to execute any one of the notification of the session ID to the image forming apparatus 20 and the notification of the session ID to the connection terminal 40 when the start of the remote session is not approved by the user of the image forming apparatus 20.

In the remote communication system 10, the session relay system 60 changes the session ID (Step S146) every time the session ID is requested by the remote maintenance system 50 (Step S145). With this configuration, the remote communication system 10 has the session ID changed every time the remote session between the connection terminal 40 and the image forming apparatus 20 relayed by the session relay system 60 is established, thereby ensuring the improved security of this remote session.

The remote communication system 10 displays the screen identical to the screen displayed on the image forming apparatus 20 on the connection terminal 40 located in the outside of the network to which the image forming apparatus 20 belongs so as to operate the image forming apparatus 20 from this connection terminal 40, thereby ensuring an easy operation of the image forming apparatus 20 from the connection terminal 40 located in the outside of the network to which the image forming apparatus 20 belongs at a low cost. For example, the connection terminal 40 is configured to cause the user of the connection terminal 40 to execute various kinds of settings to the image forming apparatus 20, such as a setting of an address book of the image forming apparatus 20, by displaying a setting screen of the image forming apparatus 20 on the display 42. The connection terminal 40 is configured to cause the user of the connection terminal 40 to execute confirmations of various pieces of information of the image forming apparatus 20, such as a confirmation of errors occurred in the image forming apparatus 20, a confirmation of a printed count with the image forming apparatus 20, and a remaining amount of toner in the image forming apparatus 20, by, for example, displaying a confirmation screen for the various pieces of information of the image forming apparatus 20 on the display 42. The connection terminal 40 is configured to cause the user of the connection terminal 40 to execute installing various kinds of software to the image forming apparatus 20, such as an installation of firmware to the image forming apparatus 20 and an installation of an application to the image forming apparatus 20, by, for example, displaying an installation screen of software to the image forming apparatus 20 on the display 42.

The connection terminal 40 can communicate with various kinds of applications in the image forming apparatus 20 by the remote session, thereby ensuring implementing various functions besides the maintenance to the image forming apparatus 20.

In this embodiment, the remote communication system 10 can execute the remote maintenance via the remote maintenance system 50 as the session management system as illustrated in FIG. 7. However, it is not necessary for the remote communication system 10 to be configured to execute the remote maintenance via the session management system.

When the server application as a target for the remote session is unusable via the remote session, the remote communication control system 15 does not relay the remote session based on the control policy and the identification information of this server application (Step S182); therefore, the server application of the image forming apparatus usable from the connection terminal via the remote session can be limited. For example, the remote communication control system 15 sets the Web Server by which the settings of the network in the LAN to which the image forming apparatus belongs can be confirmed unusable via the remote session among the server applications of the image forming apparatuses, thus ensuring improving security performance.

Since the remote communication control system 15 determines whether the server application is usable via the remote session based on the control policy 54c managed by the policy management unit 55d (Steps S149, S150, and S173), the server application of the image forming apparatus usable from the connection terminal via the remote session can be limited based on the latest control policy 54c managed by the policy management unit 55d.

Since the server application of the image forming apparatus usable from the connection terminal via the remote session can be designated to the remote communication control system 15 with respect to each of the management groups of the image forming apparatuses (Step S131), for example, a convenience of the administrator of the image forming apparatus can be improved. The server application of the image forming apparatus usable from the connection terminal by the remote communication control system 15 via the remote session may be designated by a unit other than the management group of the image forming apparatuses. For example, the server application of the image forming apparatus usable from the connection terminal by the remote communication control system 15 via the remote session may be designated with respect to each of the image forming apparatuses.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A remote communication control system comprising
a session relay system that associates a connection established with an image forming apparatus with a connection established with an electronic device located outside a network to which the image forming apparatus belongs, so as to relay a remote session which is a direct interconnection between the image forming apparatus and the electronic device via a network, and
a policy management unit that manages a control policy,
wherein the electronic device uses a server application of the image forming apparatus included via the remote session,
wherein when the server application is unusable via the remote session, the session relay system does not relay the remote session based on the control policy and identification information of the server application as a target for the remote session, the session relay system determining whether the server application is usable via the remote session or not, based on the control policy indicating whether which the server application of the image forming apparatus is usable via the remote session managed by the policy management unit.

2. A session relay system that associates a connection established with an image forming apparatus with a connection established with an electronic device located outside a network to which the image forming apparatus belongs, so as to relay a remote session which is a direct interconnection between the image forming apparatus and the electronic device via a network, and
a policy management unit that manages a control policy,
wherein the electronic device uses a server application of the image forming apparatus included via the remote session,
wherein when the server application is unusable via the remote session, the session relay system does not relay the remote session based on a control policy and identification information of the server application as a target for the remote session, the session relay system determining whether the server application is usable via the remote session or not, based on the control policy indicating whether which application of the image forming apparatus is usable via the remote session managed by the policy management unit.

3. A non-transitory computer-readable recording medium storing a session relay program, wherein the session relay program causes a computer to function as a session relay system, the session relay system associating a connection established with an image forming apparatus with a connection established with an electronic device located outside a network to which the image forming apparatus belongs, so as to relay a remote session which is a direct interconnection between the image forming apparatus and the electronic device via a network and a policy management unit that manages a control policy, wherein the electronic device uses a server application of the image forming apparatus included via the remote session, wherein when the server application is unusable via the remote session, the session relay system does not relay the session based on a control policy and identification information of the server application as a target for the remote session, the session relay system determining whether the server application is usable via the remote session or not, based on the control policy indicating whether which application of the image forming apparatus is usable via the remote session managed by the policy management unit.

* * * * *